Jan. 27, 1959 R. W. BECKWITH 2,871,463
METHOD AND APPARATUS FOR TRANSMISSION OF INTELLIGENCE
Filed Aug. 1, 1952
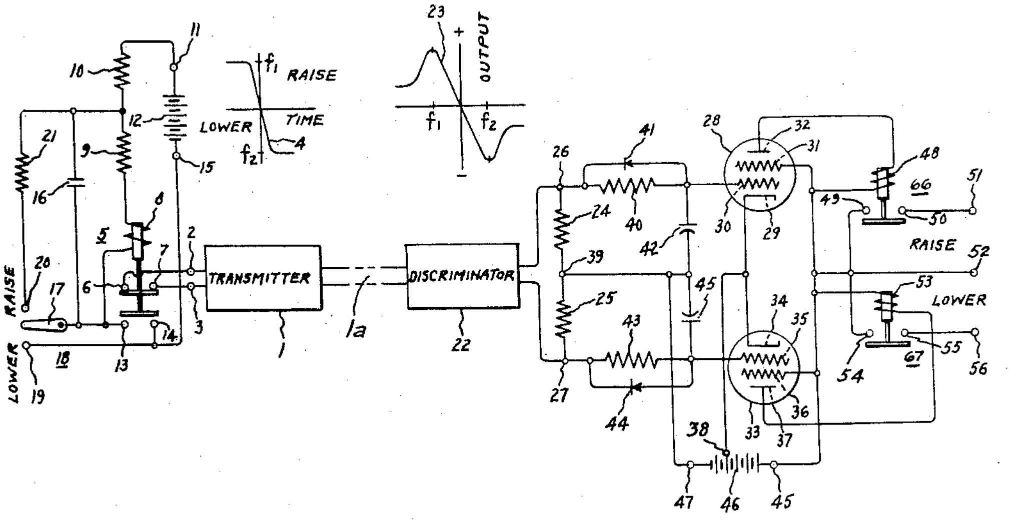
Inventor:
Robert W. Beckwith,
by Merton D. Moore
His Attorney.

United States Patent Office 2,871,463

Patented Jan. 27, 1959

2,871,463

METHOD AND APPARATUS FOR TRANSMISSION OF INTELLIGENCE

Robert W. Beckwith, North Syracuse, N. Y., assignor to General Electric Company, a corporation of New York Application August 1, 1952, Serial No. 302,049

11 Claims. (Cl. 340—171)

The present invention relates in general to method and apparatus for the transmission of intelligence and relates in particular to improvements in electrical control systems of the kind in which the transmission of one frequency therein causes one action at a receiving point of the system and transmission of another frequency causes another action at the receiving point.

Control systems of this kind, which are referred to in the art as frequency shift control systems, are, for example, utilized for controlling the operation of a prime mover from a remote point. One frequency is transmitted from the remote point to cause the prime mover to develop more power while the other frequency is transmitted to cause the prime mover to develop less power. An additional pair of frequencies is transmitted to maintain the prime mover functioning to develop the same power.

The present invention is addressed in its particular aspects to the provision of a system in which the above-enumerated three controlled functions are performed by a single frequency shift control channel utilizing two carrier frequencies instead of two such channels utilizing four carrier frequencies.

Another object of the present invention is to provide improvements in electrical transmission systems.

A further object of the present invention is to provide an improved frequency shift control system.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which is shown a schematic representation of an embodiment of my invention.

In carrying the present invention into effect there is provided transmission means for individually transmitting each of a pair of frequencies and receiving means for detecting said frequencies and for actuating respective ones of a pair of devices. To insure that the devices remain inactive when neither frequency is being transmitted, detector means are provided at the receiver responsive to periodic variations in the frequency of transmission from one frequency to the other frequency.

Referring now to the single figure of the drawing, there is shown an embodiment of the present invention comprising a transmitter 1 which is capable of developing electrical waves or oscillations of one frequency $f_1$ or another frequency $f_2$ depending upon whether a pair of terminals 2 and 3 thereof are open or short-circuited, and which is capable also of developing oscillations of a frequency periodically changing from frequency $f_1$ to frequency $f_2$ in response to the open-circuiting and short-circuiting of the terminals thereof. The transmitter may, for example, include a frequency shift oscillator of the kind described in U. S. Patent 2,531,103—Beckwith, and have the characteristics of the kind shown in the graph 4 in which the abscissa represents time and the ordinate represents frequency. When the terminals of the transmitter are open-circuited, the frequency of the transmitter steadily changes or shifts toward the frequency $f_1$. When these terminals are short-circuited, the frequency shifts steadily to the frequency $f_2$. When the terminals of the transmitter are alternately opened and closed, the frequency of the transmitter shifts between frequency $f_1$ and frequency $f_2$.

The terminals of the transmitter 1 are opened or short-circuited by the transmitter control circuit which comprises a relay 5 having a pair of normally open contacts 6 and 7, contact 6 being connected to the terminal 2 and contact 7 being connected to the terminal 3. The coil 8 of the relay 5 has one end thereof connected through resistances 9 and 10 in series to one terminal 11 of a source 12 of unidirectional potential, and has the other end thereof connected to contact 13 of a pair of normally closed contacts of relay 5, the other contact 14 of which is connected to the other terminal 15 of source 12. A capacitance 16 is connected between the junction of resistances 9 and 10, and the normally closed contact 13. The center arm 17 of a double throw, single pole switch 18 is connected to the normally closed contact 13. One pole 19 of the switch 18 is connected to the contact 14 and the other pole 20 of the switch 18 is connected through resistance 21 to the aforementioned junction of resistances 9 and 10.

In operation, when the center arm 17 of the switch 18 makes contact with the pole 19, current is caused to flow through coil 8 causing it to attract its armature to short-circuit normally open contacts 6 and 7, and the terminals 2 and 3 of the transmitter 1 to cause the latter to develop oscillations of frequency $f_2$.

When the control arm 17 of the switch 18 is in a neutral position, the relay 5 is recurrently energized, since coil 8 is connected to source 12 through normally closed contacts 13 and 14 which are recurrently opened by the energization of the relay 5. Alternately short-circuiting and open-circuiting of terminals 2 and 3 of transmitter 1 causes the latter to develop a wave in which the frequency periodically varies between frequency $f_1$ and frequency $f_2$.

When the control arm 17 of the switch 18 makes contact with pole 20 current flow from the source 12 bypasses the relay 5 through resistance 21, which is appreciably smaller in magnitude than resistance 10 so that the voltage developed across resistance 21 is insufficient to actuate the relay 5. Thus the terminals 2 and 3 of the transmitter 1 are open-circuited and the transmitter develops waves of a frequency $f_1$.

The capacitance 16 functions to minimize arcing during the alternate open-circuiting and short-circuiting of the contacts of relay 5 as well as to control the frequency of these alternations. For the purposes of the embodiment shown, it has been quite satisfactory to arrange the constants of the transmitter control circuit so that the making and breaking of the contacts of the relay occur at about twenty times per second.

The output from the transmitter 1 is transmitted over a carrier current channel 1*a* or other suitable means such as space radio, for example, to a receiver which includes a discriminator 22. This discriminator may be of the kind disclosed in U. S. Patent 2,461,956—Beckwith and which has a characteristic of the kind shown in graph 23 in which the abscissa represents frequency and the ordinate represents magnitude and polarity of the output. When waves of frequency $f_1$ are received at the discriminator 22, an output of positive polarity as shown is developed across load resistances 24 and 25 connected in series across the output terminals 26 and 27 of the discriminator 22. When waves of frequency $f_2$ are received at the discriminator 22 a voltage of the negative polarity is developed across the load resistances 24 and 25. When a frequency modulated wave modulated between frequency $f_1$ and $f_2$ is received at the discriminator 22, an alternating voltage output is developed across the load resistances 24 and 25.

The output appearing across resistances 24 and 25 is utilized to render either relay 66 or relay 67 operative, or both these relays inoperative depending upon whether frequency $f_1$, $f_2$, or the aforementioned modulations in these frequencies is being transmitted. Circuits comprising electron discharge device 28, including cathode 29 and grid 30, screen grid 31 and anode 32, and electron discharge device 33, including cathode 34, grid 35, screen grid 36 and anode 37 are provided for this purpose. The cathodes 29 and 34 are connected to point 38 of source 46 of unidirectional operating potential. The grid 30 is connected through resistance 40 shunted by unilaterally conducting device 41 to terminal 26. Grid 30 is also connected to terminal 39 through filter capacitance 42. Grid 35 is connected through resistance 43, shunted by unilaterally conducting device 44 to terminal 27. The grid 35 is also connected to terminal 39 through filter capacitor 45. The screen grids 31 and 36 are connected to the positive terminal 45 of source 46 of unidirectional operating potential, the negative terminal 47 of which is connected to terminal 39 at the junction of resistances 24 and 25. The anode 32 is connected through the coil 48 of relay 66 to the positive terminal 45. Normally open contacts 49 and 50 of relay 48 are connected in series with control terminals 51 and 52. The anode 37 is connected through coil 53 of relay 67 to positive terminal 45. The normally open contacts 54 and 55 of relay 67 are connected in series with the control terminals 52 and 56.

Terminals 51, 52 and 56 may, for example, be connected to the regulator or governor circuits of a turbine. The closing of contacts 49 and 50 may, for example, initiate an action in the regulator circuit to cause the turbine to develop more power. The closing of contacts 54 and 55 may initiate an action in the regulator circuit to cause the turbine to develop less power. Maintaining the contacts of both relays 66 and 67 open leaves the regulator, and hence the turbine, unaffected.

Thus when it is desired to actuate relay 66 to cause an increase in output from a prime mover, waves of frequency $f_1$ are transmitted. These waves received by discriminator 22 cause terminal 26 to become positive with respect to terminal 27. Thus grid 30 becomes positive with respect to cathode 29 causing current to flow through device 28 and through relay 48. Simultaneously, device 33 is rendered nonconductive since grid 35 is rendered sufficiently negative with respect to cathode 34. Actuation of relay 48 causes a completion of the circuit between terminals 51 and 52 to initiate the desired action at the prime mover to cause an increase in power output.

When it is desired to actuate relay 67 to cause a decrease in the power developed by the prime mover, waves of frequency $f_2$ are transmitted. These waves are received by discriminator 22 and cause terminal 27 to become positive with respect to terminal 26. Thus, grid 35 becomes positive with respect to cathode 34 causing current to flow through device 33 and through relay 67. Simultaneously, device 28 is rendered nonconductive since grid 30 is rendered sufficiently negative with respect to cathode 29. Actuation of relay 67 causes a completion of the circuit between terminals 52 and 56 to initiate the desired action at the prime mover to cause a decrease in power output.

When it is desired to maintain relays 66 and 67 deactuated to cause the prime mover to develop power at the same rate, waves of a frequency which is periodically varying between frequency $f_1$ and $f_2$ is transmitted. An output is developed across the terminals 26 and 27 which is alternating at the rate of periodic variation of the frequency. The output is rectified by unilaterally conducting devices 41 and 44 which are poled in a manner that the rectified voltages, which appear at the electrodes of capacitors 42 and 45 connected to grids 30 and 35, become negative with respect to the terminal 39. Accordingly, electron discharge devices 28 and 33 are maintained nonconductive and both relays 66 and 67 are maintained open.

While I have shown a particular embodiment of my invention, it will of course be understood that I do not wish to be limited thereto since many modifications, both in the circuit arrangement and in the instrumentalities employed, may be made, and I therefore contemplate by the appended claims to cover any such modifications as fall within the true spirit and scope of my invention.

What I claim as new and desire to secure by Letters Patent of the United States is:

1. The combination, in a remote control system, of signaling control means to produce signals having either of two frequencies and to produce signals having a frequency varying regularly between said frequencies, a pair of control devices, means responsive to signals of each of said frequencies to actuate a respective one of said control devices, and means responsive to the reception of signals having a frequency varying regularly between said frequencies to prevent actuation of either of said control devices.

2. The combination, in a remote control system, of a pair of control devices, signaling control means for generating waves having either of a pair of frequencies and for periodically varying the frequency thereof between said frequencies at a rate lower than the frequency of said waves, means responsive to each of said frequencies for actuating a respective one of said control devices, and means responsive to said periodic variations for preventing actuation of said control devices.

3. The combination, in a remote control system, of a pair of devices to be controlled, signaling control means for generating waves having either of a pair of frequencies and for periodically varying the frequency thereof between said frequencies at a rate lower than the frequency of said waves, a discriminator for developing control voltages of one polarity in response to waves of one frequency of said pair of frequencies applied thereto and for developing control voltages of the opposite polarity in response to waves of the other frequency of said pair of frequencies applied thereto and for developing an alternating voltage in response to alternations in said frequencies, means responsive to each of said control voltages for actuating respective ones of said device, and means including a resistance-capacitance circuit having a time constant which is large in comparison with the period of said variation between said frequencies, said last mentioned means being responsive to said alternating voltage for rendering said devices deactuated.

4. A control system comprising a transmitter for developing oscillations of two different frequencies, means for causing said transmitter to develop oscillations of one of said frequencies, means for causing said transmitter to develop oscillations of the other of said frequencies, means for causing oscillations periodically shifting in frequency from one of said frequencies to the other of said frequencies at a substantially lower frequency than said other frequencies to be developed by said transmitter, a discriminator means for developing an output of one polarity in response to one of said frequencies and for developing an output of the opposite polarity in response to the other of said frequencies and for developing an alternating output in response to said periodic shifting in frequency, a pair of control devices, means responsive to said discriminator output for actuating one of said control devices in response to oscillations of said first frequency, for actuating the other of said control devices in response to oscillations of a second frequency, and for preventing actuation of said control devices in response to said periodic shifting in frequency.

5. Control apparatus responsive to signals having first and second frequencies for signaling first and second control functions respectively and a signal periodically varying between said first and second frequencies for signaling a third control function comprising means responsive to reception of signals of each of said frequencies to produce a respective potential in said apparatus, a pair of control devices, each of said control devices being responsive to a respective one of said potentials, and means responsive to periodic variation in said potentials when the received signals periodically vary between said frequencies to prevent response of either of said control devices.

6. Control apparatus responsive to signals having first and second frequencies indicating first and second control functions respectively and a signal alternating between said first and second frequencies for indicating a third control function comprising a frequency discriminator having output of one polarity when the signals supplied to the discriminator have one frequency and output of opposite polarity when the signals supplied thereto have another frequency and an output which periodically varies in polarity when signals supplied thereto periodically vary in frequency from said one frequency to said other frequency, a pair of control device connected to the output of said discriminator, each responsive to the output of said discriminator of the respective polarity, means responsive to the alternate reception of said frequencies at a predetermined rate to develop potentials of alternative polarity, and means responsive to said potentials of alternating polarities to prevent response of either of said control devices.

7. Control apparatus responsive to signals having first and second frequencies indicating first and second control functions respectively and a signal alternating between said first and second frequencies for indicating a third control function comprising a frequency discriminator having an output, said discriminator producing a potential of one polarity across said output in response to the signal of said first frequency and a potential of opposite polarity across said output in response to the signal of said second frequency, a pair of electron control devices connected in opposite sense to said output, each of said electron control devices being arranged to pass current in response to potential across said output of the respective polarity, and means responsive to rapid alternation of the polarity of said potentials to render each of said electron control devices nonconductive.

8. The combination, in a remote control system, of signaling control means to produce signals having either of two frequencies and to produce signals having a frequency alternating between said frequencies, a pair of control devices, means responsive to signals of each of said frequencies to actuate a respective one of said control devices, and means responsive to the alternate application of signals of said two frequencies at a predetermined rate to prevent actuation of either of said control devices.

9. The combination, in a remote control system, of a pair of control devices, signaling control means for generating waves having either of a pair of frequencies and for periodically varying the frequency of said generated waves from one to the other of said frequencies at a frequency rate lower than the frequency of said waves, means responsive to waves of each of said frequencies for actuating a respective one of said control devices, and means responsive to the alternate application of waves of said two frequencies for preventing actuation of said control devices.

10. A control system comprising means for generating waves having first and second frequencies and for periodically varying at a third frequency the frequency of said generated waves from one to the other of said first and second frequencies, means responsive to waves of said first and second frequencies for producing a first control function and a second control function respectively, and means responsive to the periodical variations of frequency of said generated waves at said third frequency to produce a third control function.

11. In combination, a discriminator having an impedance, said discriminator producing a unidirectional output of one polarity across said impedance in response to signals of one frequency, a unidirectional output of opposite polarity across said impedance in response to signals of a different frequency, and an alternating polarity output in response to signals having periodically changing frequencies, a pair of terminals, a pair of resistances, one of said resistances connected between one end of said impedance and one of said terminals and, the other of said resistances connected between the other end of said impedance and the other of said terminals, a pair of capacitances, each having one electrode thereof connected to an intermediate point of said impedance, each of the other electrodes thereof being connected to respective ones of said terminals, a pair of unilaterally conducting devices, each being connected in shunt with respective ones of said resistances with like electrodes thereof connected to the ends of said resistances symmetrically situated with respect to said intermediate point, whereby the unidirectional output across said impedance appears as a unidirectional output across said terminals and the alternating output across said impedance appears as a unidirectional output of the same polarity between each of said terminals and said intermediate point, and means responsive to a unidirectional output of one polarity across said terminals for producing a first control function, responsive to a unidirectional output of opposite polarity to produce a second control function and responsive to a unidirectional output of the same polarity between each of said terminals and said intermediate point to produce a third control function.

References Cited in the file of this patent

UNITED STATES PATENTS

| | | |
|---|---|---|
| 1,838,987 | Cooper | Dec. 29, 1931 |
| 2,198,901 | Boswau | Apr. 30, 1940 |
| 2,262,932 | Guanella | Nov. 18, 1941 |
| 2,307,771 | Denton | Jan. 12, 1943 |
| 2,410,983 | Koch | Nov. 12, 1946 |
| 2,429,771 | Roberts | Oct. 28, 1947 |
| 2,461,456 | Usselman | Feb. 8, 1949 |
| 2,495,452 | Grove | Jan. 24, 1950 |
| 2,522,893 | Purlington | Sept. 19, 1950 |
| 2,558,100 | Rambo | June 26, 1951 |
| 2,604,518 | Oliver | July 22, 1952 |
| 2,611,025 | Jankowski | Sept. 16, 1952 |
| 2,611,031 | Appert | Sept. 16, 1952 |
| 2,668,871 | Violet | Feb. 9, 1954 |
| 2,677,098 | Pile et al. | Apr. 27, 1954 |
| 2,764,714 | Heyduck | Sept. 25, 1956 |

FOREIGN PATENTS

| | | |
|---|---|---|
| 941,547 | France | July 19, 1948 |